United States Patent Office 3,246,514
Patented Apr. 19, 1966

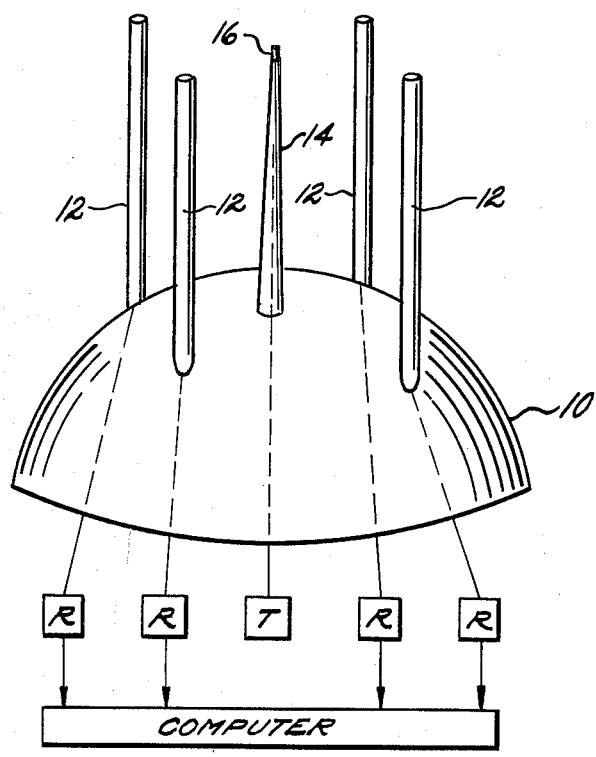

3,246,514
SINGLE ELEMENT ELECTRONIC WIND SPEED AND DIRECTION SENSOR
Walter J. Gremlitz, 3 Wildwood Drive, Milford, Mass., and Lester D. Knisell, Jr., 58 Butler St., R.F.D. 3, Buzzards Bay, Mass.
Filed Feb. 28, 1964, Ser. No. 348,307
3 Claims. (Cl. 73—189)

The invention described herein may be manufactured and used by or for the United States Government for governmental purposes without payment to us of any royalty thereon.

The present invention relates to a single element wind velocity and direction sensor.

The principal object of the invention is the provision of a device which is capable of employing electronic means for the detection of wind direction and velocity whereas mechanical means, involving intricate and numerous moving parts, have heretofore been employed. In the present invention transmitting and receiving antennas arise vertically from a dome, their positions of attachment to the dome being stationary.

Another object of the invention is the provision of a wind velocity and direction measuring device, having no moving parts except a single flexible transmitting antenna, which bends under the influence of wind force, thus changing the distance between it and a series of unmoving receivers.

A further object of the invention is the provision of a device which provides greater accuracy, greater durability and immunity to the effects of extreme atmospheric conditions.

A further object of the invention is a device whose basic design lends itself readily to heating, deicing, or coating with suitable materials for rendering it impervious to the effects of ice and snow and further, capable of being itself made of such materials that is is impervious to the effects of ice and snow, and can withstand any extremes of temperature.

The design of the device is, further such that maintenance is reduced to a minimum.

The design of the device and its durability render it capable of withstanding shocks and tremendous forces in handling, transporting and actual use. It can also be made in any dimensions, either very large, or it can be adapted for small devices even to miniaturization, and it can be placed in any expedient place. The simplicity of the device also reduces construction costs to a minimum.

These and other advantages, features and objects of the invention will become more apparent from the following description taken in connection with the illustrative embodiment, in the accompanying drawing, wherein the figure is a perspective representation of the device.

The device comprises a body portion 10, shown in the drawing as a semi-spherical non-conducting dome element. Four receiving antennas 12 arise vertically from the dome 10. Their attachment to the dome is fixed and immovable. A flexible antenna 14 is also immovably secured to the dome at its apex. The four receiving antennas 12 are mounted on the dome 10 at equal distances from the apex, and at 90° quadrants away from each other. Four receiving antennas are shown and their distance from each other is a 90° quadrant. It is to be noted, however, that any number of such elements can be used within the scope of the invention.

They may also be placed on surfaces other than dome shaped. They may be placed at unequal distances from the transmitting antenna, the proper compensation being effected within the computing unit with reference to the direction from which the transmitted impulse arises. The signals transmitted by the transmitting antenna 14 originate in a conventional transmitter T capable of transmitting a continuous radio frequency signal which is received by each of the receiving antennas 12 and presented to standard receivers R. Wind causes the flexible transmitting antenna to bend away from the direction of the wind force and thus toward one or a combination of two or more of the receiving antennas (more than two in the event that more than four receiving antennas are used). The strength of the signal received by any receiver R is determined by distance of the receiving antenna from the transmitting antenna. The signals thus received from the receivers R are directed to a conventional computer element indicated in the figure and here the relative strengths of these signals are correlated and computations made to determine wind direction and velocity.

The flexible antenna 14 may be of any flexible material capable of transmitting a radio frequency signal. In the preferred construction shown, the antenna 14 tapers gradually upward from its base where it attaches to the dome 10, so that it is relatively pointed at the top. It may be made throughout its length of conducting material capable of transmitting radio frequency signal. It may also be made of fiber glass or other non-transmitting flexible material and having a thin conducting antenna element 16 installed in conjunction with it, extending upward through its center.

The receiving antennas are constructed of any material capable of receiving a radio frequency signal.

Although the invention has been described with reference to a particular embodiment, it will be understood to those skilled in the art that the invention is capable of a variety of alternative embodiments within the spirit and scope of the appended claims.

We claim:
1. A device for electronically determining wind direction and velocity comprising a single flexible radio frequency transmitting element capable of bending when subjected to wind force, a plurality of rigid elements capable of receiving radio frequency signals, said elements being in positions equidistant from said flexible transmitting element, each of said receiving elements receiving radio frequency signals from said transmitting element of a strength proportional to the distance between said transmitting and said receiving elements, and means connected to the transmitting antenna for generating a radio frequency signal, and means connected to the receiving antennas for computing wind directions and velocity from the received signals.

2. A single element electronic wind direction and velocity sensor comprising a dome shaped semi-spherical member, a flexible member arising vertically from the apex of said dome and capable of continuous tranmission of signals of radio frequency, said flexible member also capable of bending under the influence of wind forces, four rigid members also arising vertically from said dome and placed at positions equidistant from said flexible member and at 90° distances from each other and capable of receiving radio frequency signals transmitted from said flexible members, the strength of the signals received by each receiving member being proportional to the distance between said transmitting member and the particular member receiving said signal, wherefrom computations of wind direction and velocity can be made, and means connected to the transmitting antenna for generating a radio frequency signal, and means connected to the receiving antennas for computing wind direction and velocity from the received signals.

3. A single element wind velocity and direction sensor comprising a dome shaped member, a flexible fiber glass member integrally formed with said dome and arising vertically from the apex of said dome, a member extending from the base to the top of said fiber glass member and capable of transmitting continuously a radio frequency signal, said fiber glass member being capable also of bending under the influence of wind forces, a plurality of rigid elements arising vertically from said dome, said rigid elements being placed equidistant from said transmitting member in circumferential formation and in equal-arc distances from each other, each of said elements being capable of receiving signals from said transmitting element, any one specific signal received being of a strength proportional to the distance between said transmitting member and the element receiving said specific signal, and means connected to the transmitting antenna for generating a radio frequency signal, and means connected to the receiving antennas for computing wind direction and velocity from the received signals.

References Cited by the Examiner

UNITED STATES PATENTS

| | | | |
|---|---|---|---|
| 2,408,048 | 9/1946 | Deloraine et al. | 343—15 |
| 2,633,028 | 3/1953 | Fillebrown | 317—246X |
| 2,665,896 | 1/1954 | Kirby et al. | 73—516X |
| 3,160,005 | 12/1964 | Miller et al. | 73—181 |

RICHARD C. QUEISSER, *Primary Examiner.*

JERRY W. MYRACLE, *Assistant Examiner.*